C. WAGNER & A. HORMEL.
MOWER.
APPLICATION FILED JUNE 26, 1918.

1,291,295.

Patented Jan. 14, 1919.
3 SHEETS—SHEET 1.

Inventors
Charles Wagner &
August Hormel
By their Attorney

C. WAGNER & A. HORMEL.
MOWER.
APPLICATION FILED JUNE 26, 1918.
1,291,295.
Patented Jan. 14, 1919.
3 SHEETS—SHEET 2.
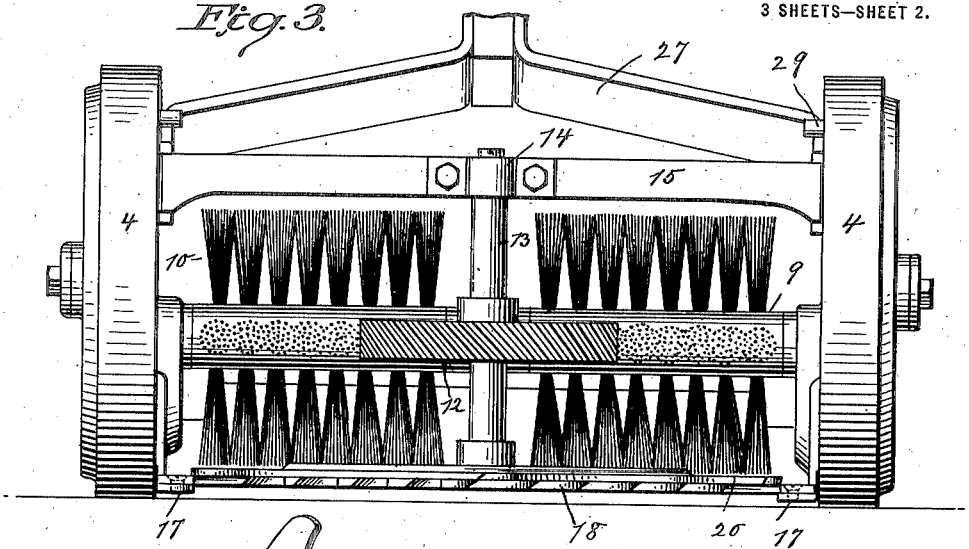
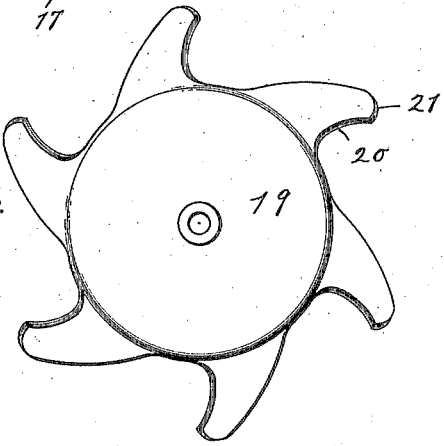
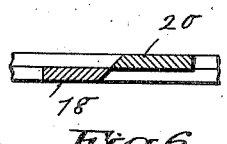
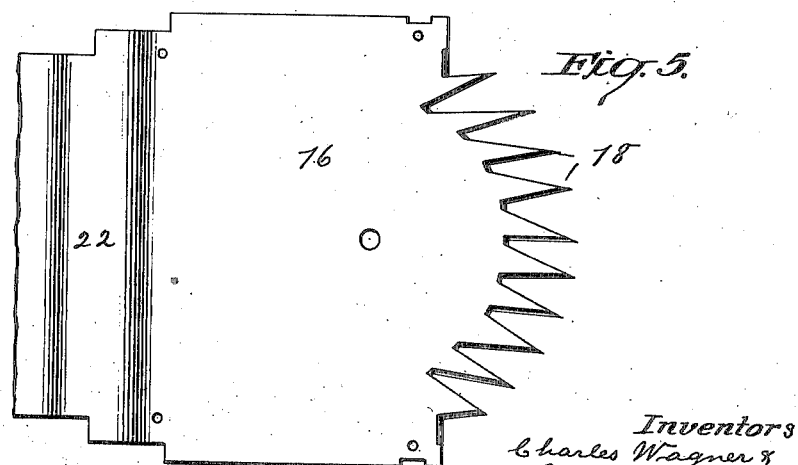
Inventors
Charles Wagner &
August Hormel
By their Attorney

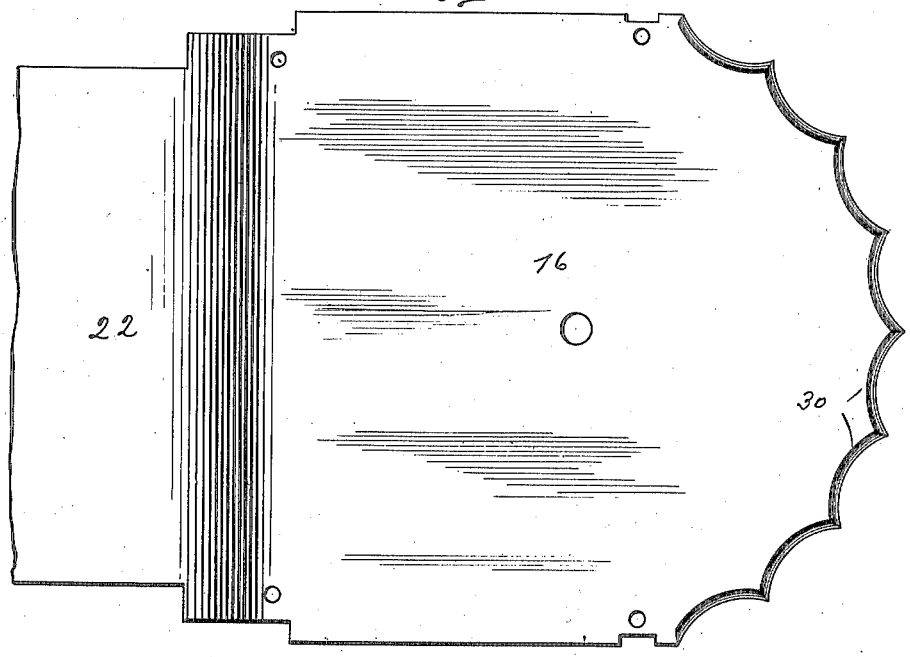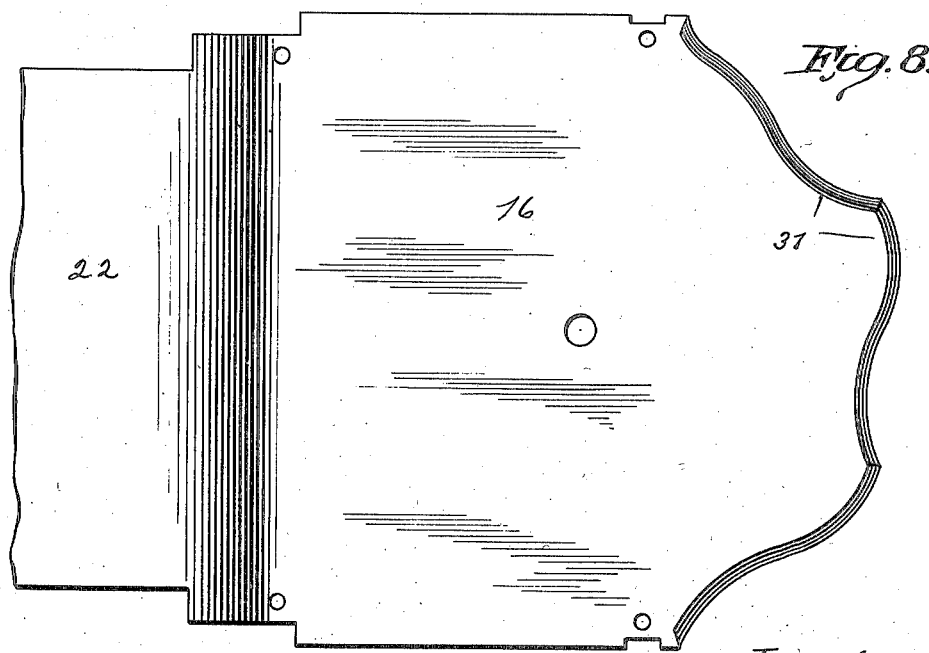

UNITED STATES PATENT OFFICE.

CHARLES WAGNER, OF GRANTWOOD, NEW JERSEY, AND AUGUST HORMEL, OF NEW YORK, N. Y.

MOWER.

1,291,295.        Specification of Letters Patent.      Patented Jan. 14, 1919.

Application filed June 26, 1918. Serial No. 241,933.

*To all whom it may concern:*

Be it known that we, CHARLES WAGNER and AUGUST HORMEL, both citizens of the United States, and residents, respectively, of Grantwood, in the county of Bergen and State of New Jersey, and of New York city, in the county and State of New York, have invented certain new and useful Improvements in Mowers, of which the following is a specification.

This invention relates to a mower of novel construction which is particularly adapted for cutting lawns though it may also be applied for the cutting of grass and forages generally. The mower is of simple construction, is adapted to work rapidly, is not apt to clog and may be readily sharpened.

Figure 1:
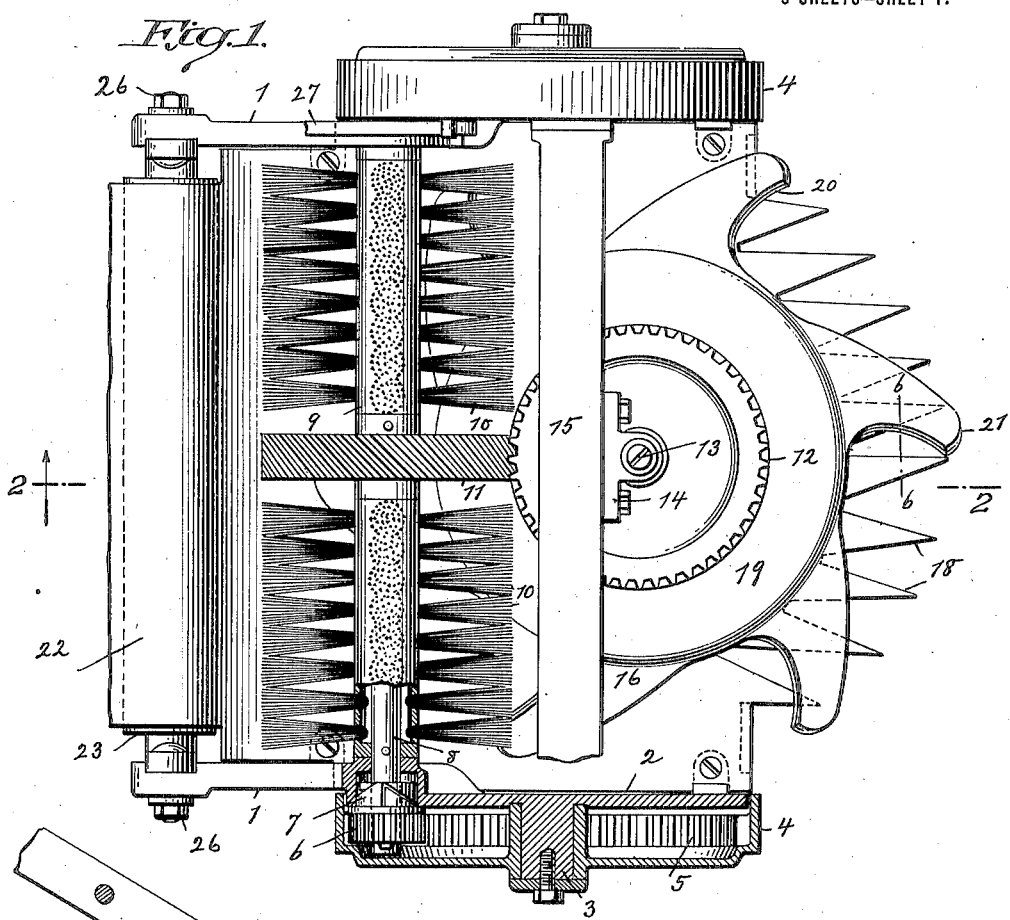
Figure 2:
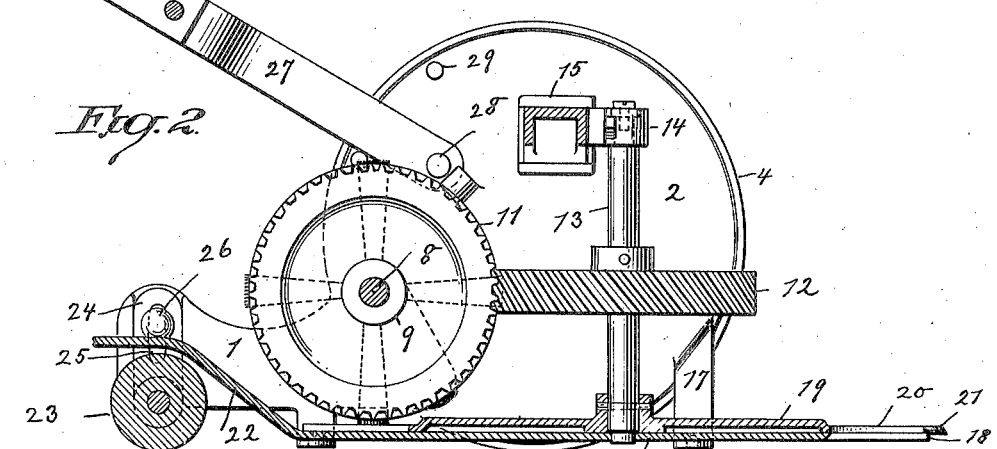

In the accompanying drawings:

Figure 1 is a plan partly in section of a mower embodying our invention;

Fig. 2, a cross section on line 2—2 Fig. 1;

Fig. 3, a front elevation;

Fig. 4, a plan of the movable cutting disk;

Fig. 5, a bottom view of the fixed cutting plate;

Fig. 6, a section on line 6—6 Fig. 1; and

Figs. 7 and 8, are bottom views of modifications of the fixed cutting plate.

The mower comprises a frame 1, provided at each side with a disk 2, having a hub 3. On this hub turns a recessed traction wheel 4, having an internal gear 5, that meshes into a pinion 6. The latter by suitable clutch mechanism 7, is so coupled to a horizontally disposed shaft 8, journaled in frame 1, that as the machine is advanced over the ground, the shaft is turned, while when the machine is retracted, the shaft will remain motionless. Shaft 8 is encompassed by a relatively fixed tubular sleeve 9, furnished with tufts of bristles 10, the whole constituting a horizontally disposed cylindrical brush which is located at the back of the machine extending across the machine frame between the traction wheels 4.

On shaft 8, is fast a gear wheel 11, meshing into a wheel 12 mounted on an upright shaft 13 which at its upper end engages a bearing 14, bolted to a cross arm 15 of frame 1. The lower end of shaft 13 is stepped into a bed plate 16, which is by brackets 17 that are affixed to frame 1, supported in a substantially horizontal position. This bed plate is located a slight distance above the tread of the traction wheels so as to move over the ground at an elevation, corresponding substantially to the height at which the stalks are to be severed. The forward or working edge of bed plate 16 is of curved shape and is provided with a plurality of beveled teeth 18, so as to constitute the fixed blade or member of a circular serrated cutter. The movable blade or member of this cutter consists of a substantially horizontally disposed disk 19 keyed to shaft 13, directly above plate 16, and furnished with a number of beveled teeth 20, that are adapted to move over teeth 18, so that when the disk is rotated, the grass will be cut off by a shearing action. While the working edges of teeth 18 are preferably straight, those of teeth 20 are preferably concaved, and furthermore, the former are set preferably, more closely than the latter, the object of which construction is to prevent clogging. So also teeth 20 extend peripherally, some distance beyond teeth 18, and are provided with protruding rounded tips 21 which on the rotation of the disk will strike and throw off tangentially stones and other obstructions, which would be apt to block or break the teeth.

At its rear end, bed plate 16, is deflected upwardly as at 22, to constitute an overhang for the accommodation of a rear ground roller 23, which is hung in bearings 24, and is adapted to support the back of the machine. Bearings 24, are vertically adjustable being provided with elongated slots 25, engaged by bolts 26, that are tapped into the machine frame. By adjusting the bearings higher and lower, the dip of the machine, and consequently the elevation of its cutting edges above the ground may be accurately set, so as to conform to the wishes of the operator.

The machine is provided with a handle 27, pivoted at 28 and checked against undue upward movement by stops 29.

As the mower is pushed over the lawn, the grass will be quickly and effectively cut by means of the blades, of which the upper blade 19 receives rotating motion from the traction wheels by means of the cylindrical brush and the intergeared shaft 13. The severed grass which falls upon blade 19, will by the brush, be pushed from said blade upon plate 16 the correlation of the parts being such, that the latter protrudes rearwardly a distance beyond blade 19, and that the brush is hung vertically above such protruding portion, so as to sweep partly over the blade. From the protruding portion of plate 16, the brush sweeps the grass over the upwardly deflected section 22 thereof, from whence it is gathered in a suitable receptacle (not shown) fastened to the back part of the machine.

If the mower is to be sharpened, bearing 14 is unbolted from arm 15 to release shaft 13, blade 19 is uncoupled from the shaft and bed plate 16 is unscrewed from the bracket 17.

It will be seen that by the use of the flat shearing blades which are moved over the ground in a substantially horizontal plane, a large body of grass will be simultaneously grasped and cut, so that the machine works with great rapidity. Moreover, the construction is such, that the machine is not apt to clog, and that its blades may be readily sharpened.

In Fig. 7 the teeth 30 of the bed plate 16 are shown to be scalloped, while in Fig. 8, the teeth 31 are shown to be of concavo-convex form.

We claim:

1. A mower comprising a frame, a bed plate supported thereby in a substantially horizontal position, a coöperating toothed disk rotatably supported above the bed plate, and a rotary horizontally disposed brush hung in the back of the frame in a plane above the bed plate, the cut grass being carried to the back of the machine by the toothed disk and then swept off by the rotary brush.

2. A mower comprising a frame, a toothed bed plate supported thereby in a substantially horizontal position, a pair of traction wheels, a rotary horizontally disposed brush hung in the back of the frame in a plane above the bed plate and between said traction wheels, said brush being actuated by said wheels, a shaft intergeared with the brush, and a toothed disk mounted on said shaft above said bed plate, the cut grass being carried to the back of the machine by the toothed disk and then swept off by the rotary brush.

3. A mower comprising a frame, a toothed bed plate carried thereby, a shaft, a toothed disk mounted on the shaft above said bed plate, said bed plate protruding rearwardly beyond said disk, and a horizontally disposed rotary brush located above the protruding portion of said bed plate and intergeared with said shaft.

CHARLES WAGNER.
AUGUST HORMEL.